Patented May 11, 1937

2,080,032

UNITED STATES PATENT OFFICE 2,080,032

NONALCOHOLIC BEVERAGE

Frederick Lyle Douglas, Barrie, Ontario, Canada

No Drawing. Application August 3, 1935,
Serial No. 34,600

3 Claims. (Cl. 99—74)

This invention relates to non-alcoholic beverages, and the object thereof is to produce a healthful, cold, beverage which because of its distinctive qualities is agreeable in effect and flavor to the average adult as well as child, especially in summer.

The beverage consists of the admixture of the following ingredients:

Alkaline-reacting natural or synthetic fruit juices, such as the juice of limes, lemons, grapes, oranges, and grape-fruit; sugar syrup, preferably prepared according to the British Pharmacopoeia, which specifies ten parts by weight of sugar to five parts by weight water; mineralized glucose, which is glucose in powdered form, containing two (2) per centum calcium glycerophosphate; and natural or charged water.

In compounding the beverage in small quantities, I prefer to use the ingredients in about the following proportions:

| | | |
|---|---|---|
| Fruit juices | fluid drams | 4 |
| Sugar syrup | do | 4 |
| Glucose | grains | 175 |
| Water sufficient to make | fluid ounces | 5 |

Good results may be obtained, however, when the ingredients are varied within the following limits: fruit juices 2 to 5 fluid drams; syrup 1 to 6 fluid drams; glucose 80 to 270 grains, and water sufficient to make from 4 to 6 fluid ounces.

When the beverage is made up by the gallon, the following proportions of the ingredients are used:

| | Ounces |
|---|---|
| Fruit juices preserved | 16 |
| Sugar syrup | 16 |
| Glucose | 12.8 |
| Water | 160 |

Since the beverage will usually be manufactured in quite large quantities to be kept in stock, the fruit juices will have to be treated to preserve them. Any well-known, or otherwise, preservative, may be used, and in any suitable manner, such as sulphur dioxide. But when the beverage is prepared in small quantities to order and sold over the counter for immediate consumption, a preservative is not necessary.

The water may be natural or charged.

The method of compounding is as follows: The glucose is dissolved in the water, and then the sugar syrup is added thereto. These ingredients are then thoroughly mixed, and afterwards the fruit juice is added. The admixture is thoroughly mixed to form a homogeneous liquid body. In appearance the beverage, at atmospheric temperature, is cloudy or more or less translucent.

What I claim as my invention is:

1. An alkaline reacting natural or preserved fruit juice beverage containing fruit juice, glucose and calcium glycerophosphate in approximately the following proportions:

| | Parts |
|---|---|
| Fruit juice | 16 |
| Mineralized glucose containing 2% calcium glycerophosphate | 12.8 |

2. An alkaline reacting natural or preserved fruit juice beverage containing fruit juice, glucose, calcium glycerophosphate, sugar and water in approximately the following proportions:

| | | |
|---|---|---|
| Fruit juice | fluid drams | 4 |
| Sugar syrup (5 parts water to 10 parts sugar by weight) | fluid drams | 4 |
| Mineralized glucose containing 2% calcium glycerophosphate | grains | 175 |
| Water to make | fluid ozs | 5 |

3. An alkaline reacting or natural preserved fruit juice beverage containing lime juice, glucose, calcium glycerophosphate, sugar and water in approximately the following proportions:

| | | |
|---|---|---|
| Lime juice | fluid drams | 4 |
| Sugar syrup (5 parts water to 10 parts sugar by weight) | fluid drams | 4 |
| Mineralized glucose containing 2% calcium glycerophosphate | grains | 175 |
| Water to make | fluid ozs | 5 |

FRED. L. DOUGLAS.